No. 891,331. PATENTED JUNE 23, 1908.
F. C. EMRICK.
MACHINE FOR FORMING ARTICLES FROM PULP FIBER.
APPLICATION FILED JUNE 10, 1907.
9 SHEETS—SHEET 1.

Fig. 1.

Witnesses
Inventor:
Frank C. Emrick
BY Bakewell & Cornwall ATTYS.

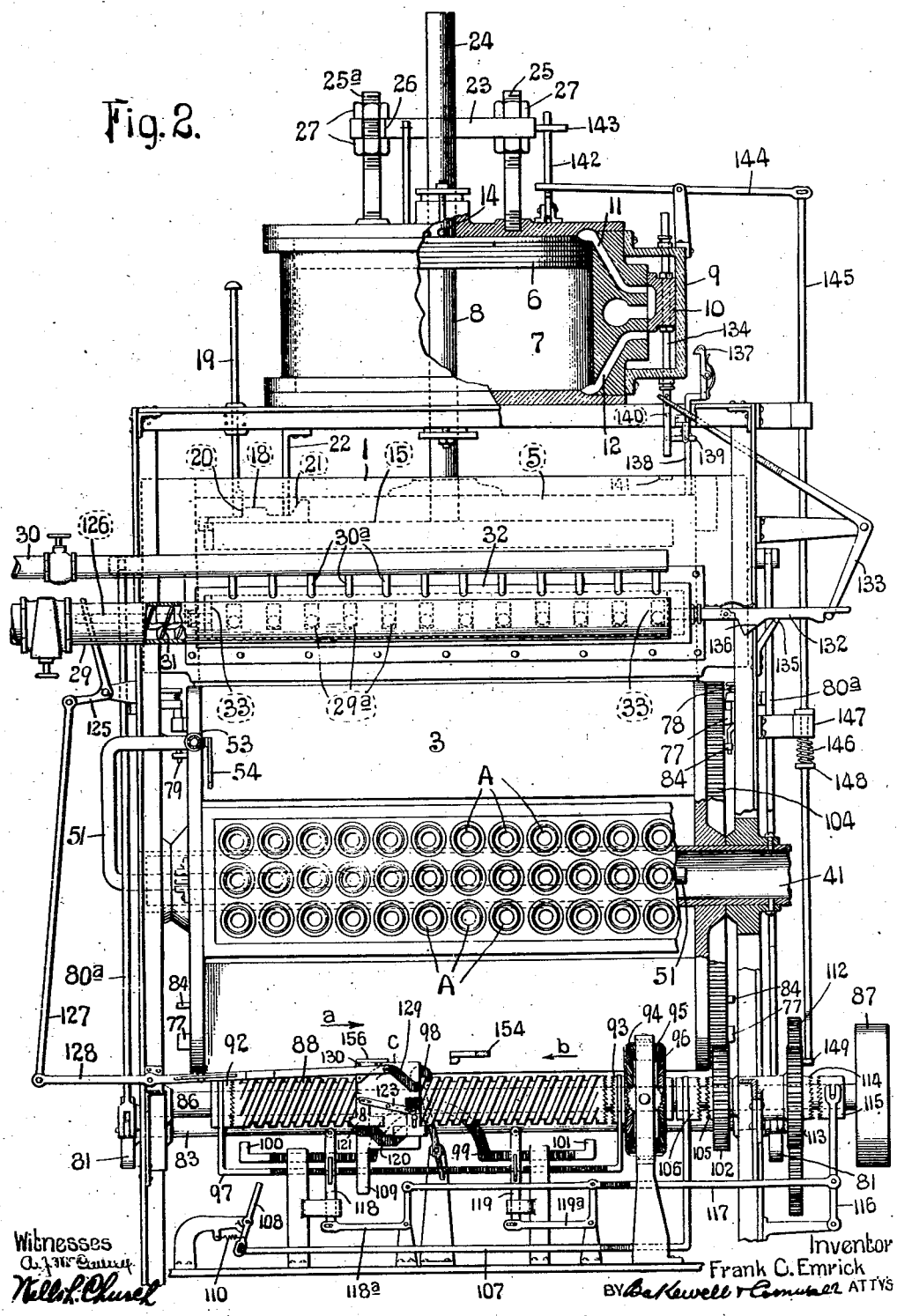

No. 391,331. PATENTED JUNE 23, 1908.
F. C. EMRICK.
MACHINE FOR FORMING ARTICLES FROM PULP FIBER.
APPLICATION FILED JUNE 10, 1907.
9 SHEETS—SHEET 3.
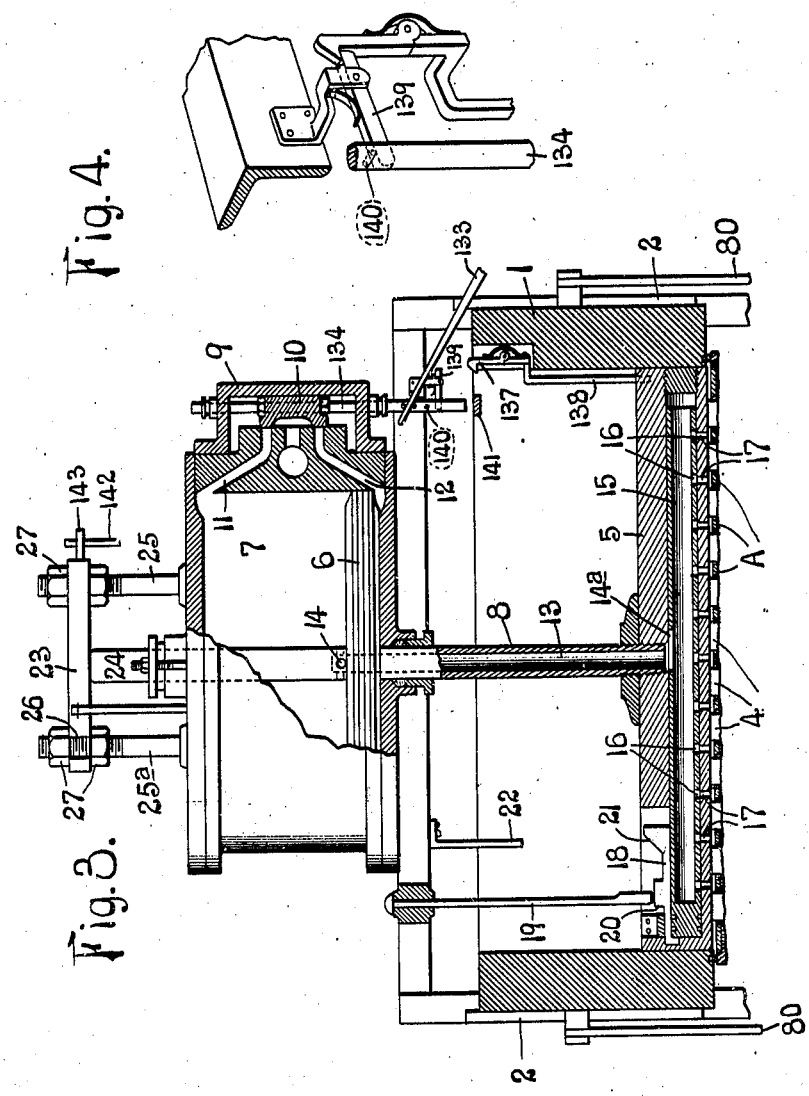
Witnesses
A. J. McCauley
Wells R. Church
Inventor:
Frank C. Emrick
by Bakewell & Cornwall
Att'ys.

No. 891,331. PATENTED JUNE 23, 1908.
F. C. EMRICK.
MACHINE FOR FORMING ARTICLES FROM PULP FIBER.
APPLICATION FILED JUNE 10, 1907.
9 SHEETS—SHEET 4.

Witnesses
A. J. McCauley
Nells L. Church

Inventor:
Frank C. Emrick
by Bakewell & Cornwall
Atty's.

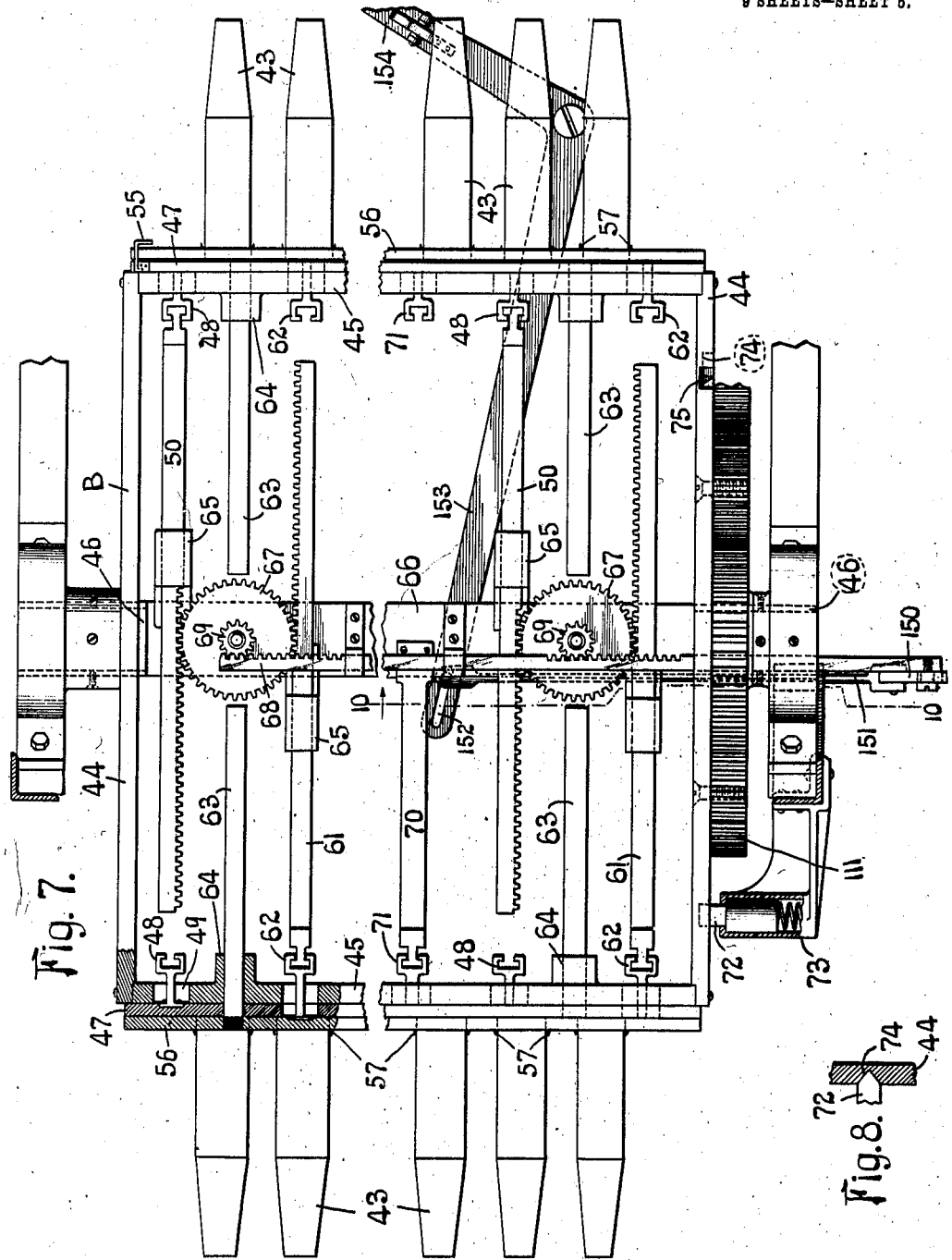

No. 891,331. PATENTED JUNE 23, 1908.
F. C. EMRICK.
MACHINE FOR FORMING ARTICLES FROM PULP FIBER.
APPLICATION FILED JUNE 10, 1907.
9 SHEETS—SHEET 6.
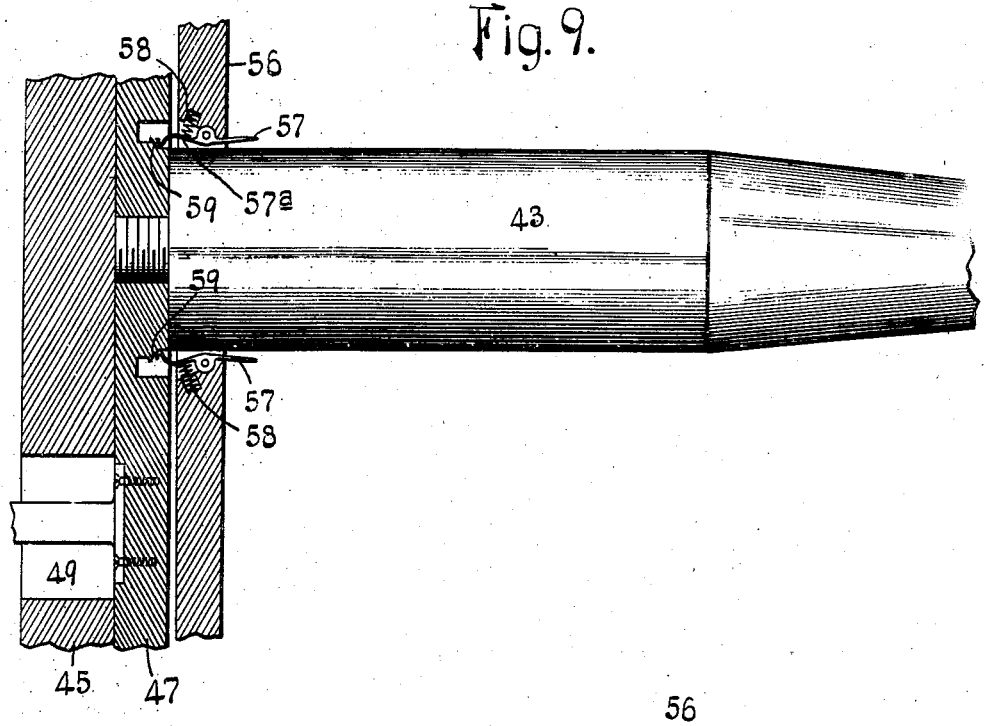
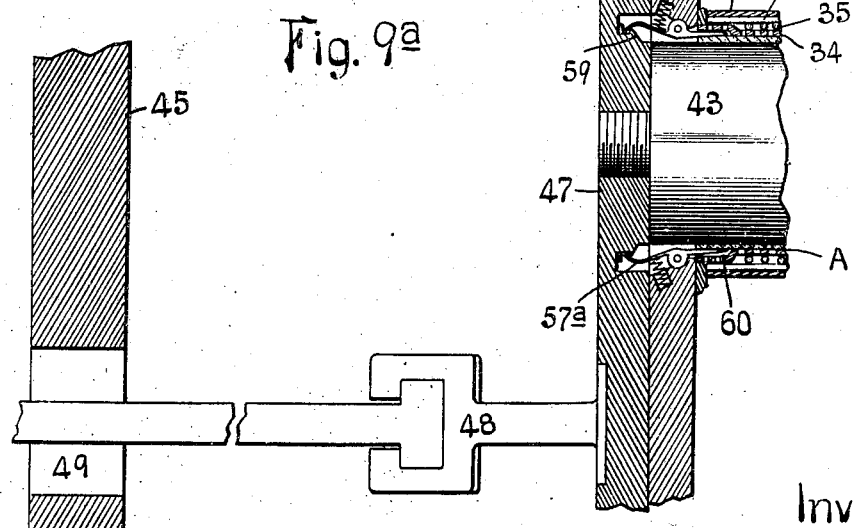
Witnesses
Inventor:
Frank C. Emrick
by Bakewell Cornwall
Atty's.

No. 891,331. PATENTED JUNE 23, 1908.
F. C. EMRICK.
MACHINE FOR FORMING ARTICLES FROM PULP FIBER.
APPLICATION FILED JUNE 10, 1907.

9 SHEETS—SHEET 7.

Witnesses
A. J. McCauley
Wells R. Church

Inventor:
Frank C. Emrick
by Bakewell & Cornwall
Att'ys

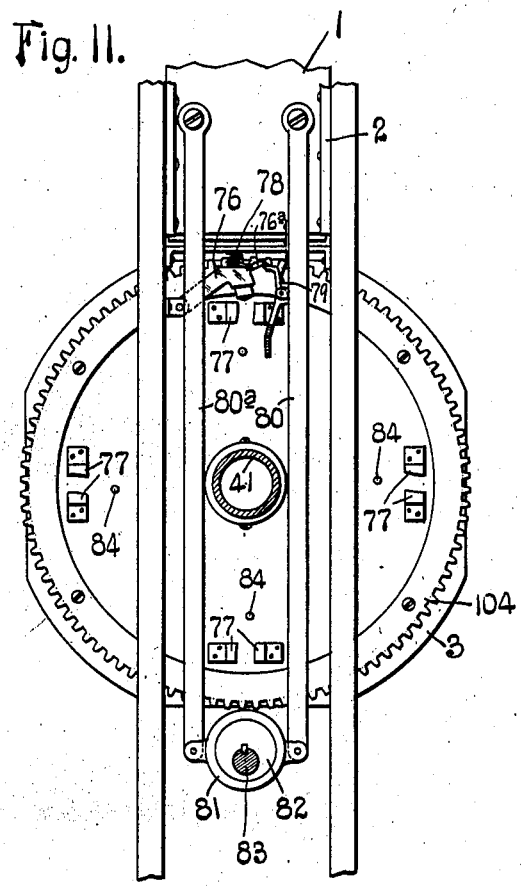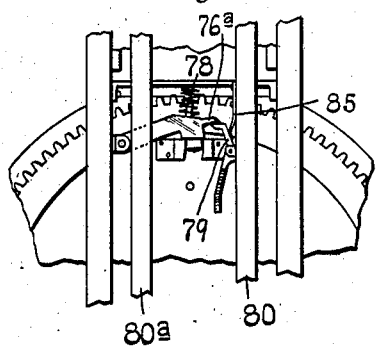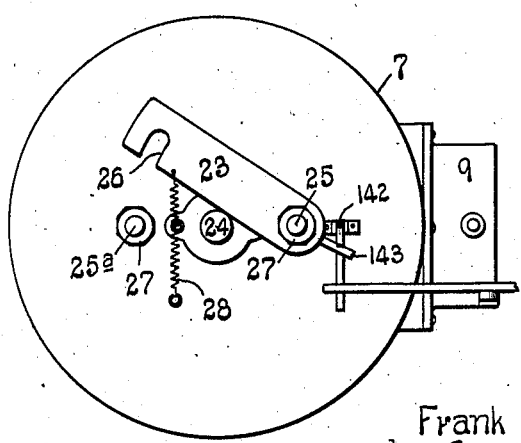

No. 891,331. PATENTED JUNE 23, 1908.
F. C. EMRICK.
MACHINE FOR FORMING ARTICLES FROM PULP FIBER.
APPLICATION FILED JUNE 10, 1907.
9 SHEETS—SHEET 9.
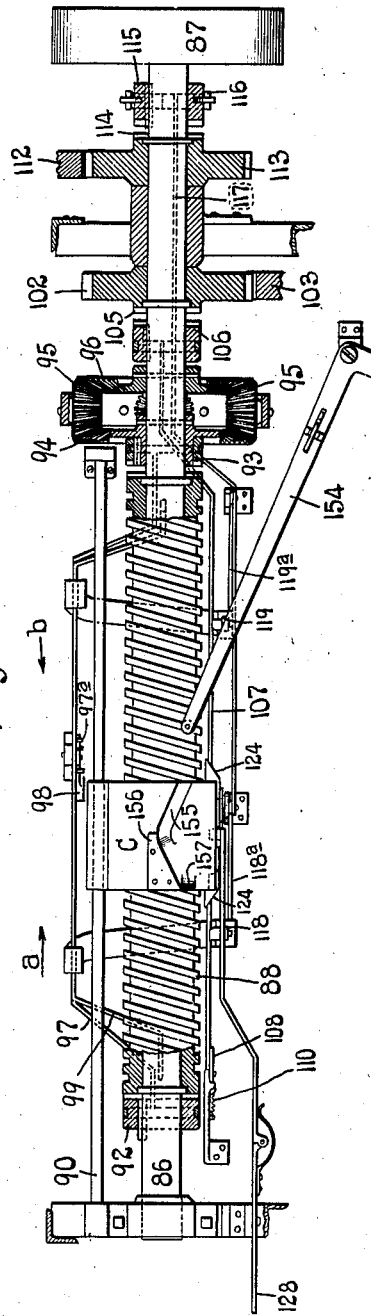
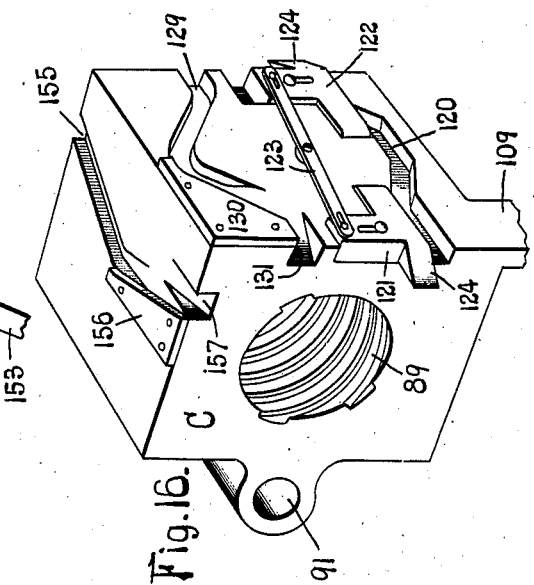
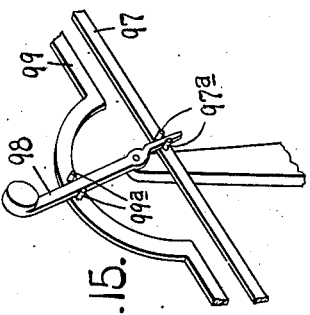
Witnesses
A. J. McCauley
Wells L. Church
Inventor:
Frank C. Emrick
by Bakewell & Cornwall
Attys.

UNITED STATES PATENT OFFICE.

FRANK C. EMRICK, OF ST. LOUIS, MISSOURI.

MACHINE FOR FORMING ARTICLES FROM PULP FIBER.

No. 891,331.　　　　　Specification of Letters Patent.　　Patented June 23, 1908.

Application filed June 10, 1907. Serial No. 378,186.

*To all whom it may concern:*

Be it known that I, FRANK C. EMRICK, a citizen of the United States, residing at St. Louis, Missouri, have invented a certain new and useful Improvement in Machines for Forming Articles from Pulp Fiber, of which the following is a full, clear, and exact description, such as will enable others skilled in the art to which it appertains to make and use the same, reference being had to the accompanying drawings, forming part of this specification, in which—

Figure 5:
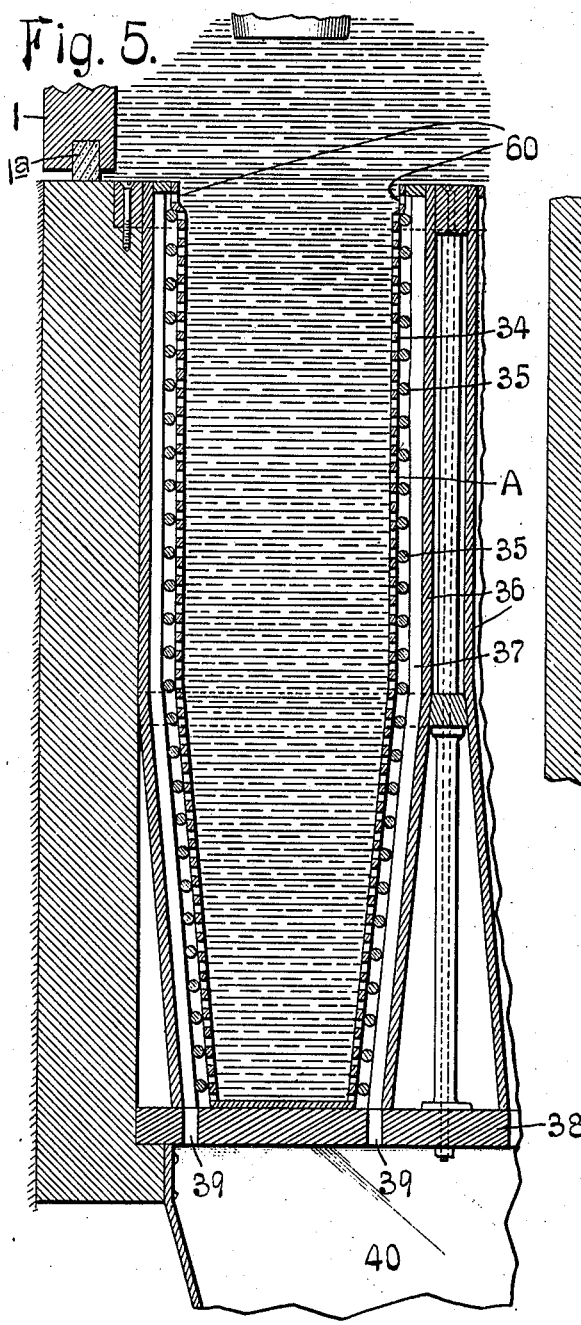
Figure 6:
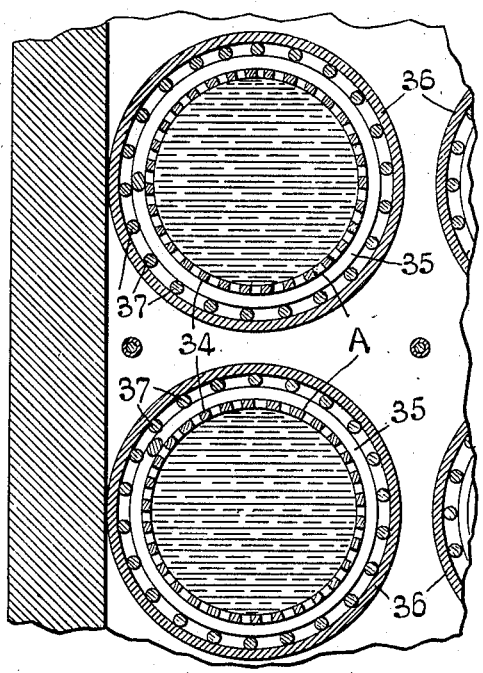
Figure 10:
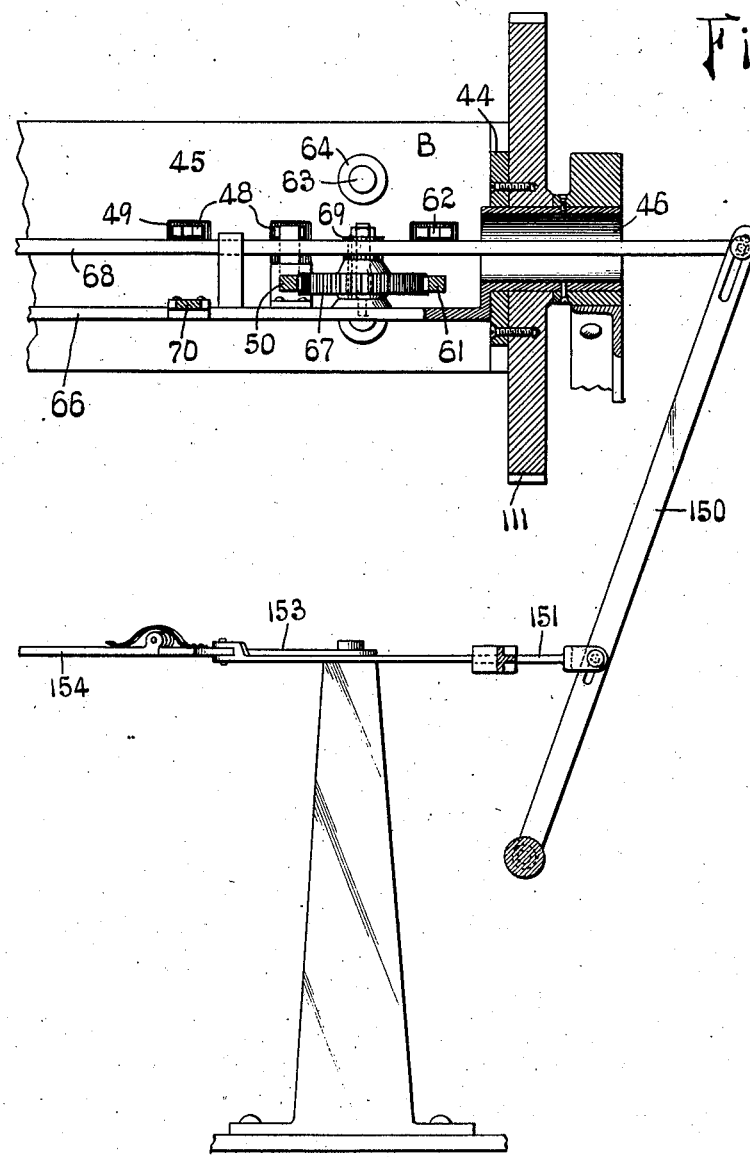

Figure 1 is an end elevation, partly in section of a machine constructed in accordance with my invention; Fig. 2 is a front elevation of said machine; Fig. 3 is a detail vertical sectional view showing the construction of the plunger-carrying piston that operates in the pulp water receptacle; Fig. 4 is a detail perspective view of part of the mechanism that actuates the slide valve in the steam chest; Fig. 5 is an enlarged vertical sectional view of one of the molds or dies; Fig. 6 is a cross sectional view of Fig. 5; Fig. 7 is a top plan view of the pick-up mechanism; Fig. 8 is a detail view of the locking device for the frame which carries the pick-up devices; Fig. 9 is an enlarged view of one of the pick-up devices and shows the plate which carries said devices and also the stripper plate; Fig. 9ª is a view similar to Fig. 9 and shows a portion of a completed article mounted on the pick-up device; Fig. 10 is an elevation taken on about the line 10—10 of Fig. 7; Fig. 11 is an end view of the turret showing the means for locking the turret; Fig. 12 is a detail view of the locking means showing it in operative position; Fig. 13 is a top plan view showing the latch that locks the plunger-carrying piston in its lowered position; Fig. 14 is a top plan view partly in section of the mechanisms that impart movement to the main elements of the machine; Fig. 15 is a detail perspective view of the shifting mechanism for the clutches that coöperate with the screw on which the controlling block travels; and Fig. 16 is an enlarged perspective view of the controlling block.

This invention relates to machines for forming articles from pulp fiber.

I have herein illustrated my invention as embodied in a machine for forming bottle wrappers or cases that are adapted to be placed on bottles to prevent them from knocking against each other during transportation.

One object of my invention is to provide a machine for forming approximately tubular-shaped or hollow articles from liquid pulp fiber and which is so constructed that the articles being formed will be of uniform thickness.

Another object is to provide a machine that is entirely automatic in its operation and which will form a great number of articles in a short space of time.

One novel feature of my invention consists in forming a hollow or tubular-shaped article from liquid pulp fiber by means of a perforated mold, a plunger adapted to project thereinto to force the major portion of the liquid through the perforations in the mold and thus compact the fibers closely together upon the inner face of the mold and air or steam pressure for completing the operation of compacting the fibers together, and also forcing the water out of the fiber and drying the fiber.

Another novel feature of my machine consists in the means that is employed for removing the articles from the molds in which they are formed, said means being so constructed that the articles are not crushed or damaged when they are removed from the molds and while they are still comparatively moist or damp. And still another novel feature of my machine consists in the mechanism that is employed for controlling the operation of the various elements of the machine.

While I have herein illustrated my invention as embodied in a machine for forming tubular-shaped bottle wrappers, it will, of course, be understood that the machine could be used for forming various other articles by substituting different molds and slightly modifying other parts of the machine. Furthermore, I wish it to be understood that the mechanism I have herein shown for controlling the operation of the various elements of the machine is not limited in its use to a machine of this type as said mechanism could be used in various other types of machines that comprise elements which operate in a certain sequence.

Briefly described, the machine herein illustrated comprises a receptacle for receiving "pulp water"; namely, water with which grains of pulp are mixed, a movable member provided with a plurality of hollow perforated molds or dies which are brought into alinement with the pulp water receptacle to receive a charge of pulp water, plungers adapted to move into said molds to force some of the water through the perforations therein and thus arrange the pulp fibers upon the inner faces of the molds, and means for introducing air or steam above the remaining portion of the water in the receptacle to complete the operation of forcing the water out of the molds and compacting the fibers closely together and also drying the fiber. The movable member above referred to is provided with a number of sets of molds and after articles have been formed in one set of molds said movable member is moved to bring an "empty" set of molds into position to receive their charge of pulp water and also carry the "filled" set of molds into alinement with the means that removes the completed articles from the molds. This removing means consists of movable devices that conform to the shape of the finished articles and means, preferably air pressure, for forcing said articles out of the molds and onto said movable devices which thereafter convey the finished articles to a point where they are collected together.

Referring to the drawings which illustrate a machine embodying the preferred form of my invention, 1 designates a receptacle that is adapted to hold a quantity of pulp water, said receptacle being of approximately oblong shape and located at the back of the machine. This receptacle is reciprocatingly mounted in guideways 2 formed by stationary parts of the frame of the machine, and the upper and lower ends of the receptacle are open, as shown in Fig. 1. A movable member, herein shown as a rotatable turret 3, is located underneath the receptacle 1, and said turret is provided with four sets of hollow perforated molds or dies A, each set comprising a plurality of molds, as shown in Figs. 1 and 2. A gang of plungers 4 is reciprocatingly mounted inside of the receptacle 1, as shown in Fig. 1, and after one set of molds have received their charge of pulp water the plungers 4 are moved downwardly into the molds to force the water through the perforations therein and arrange the pulp fibers upon the inner faces of the molds. Said plungers are carried by a piston 5 that fits snugly inside of the receptacle 1 and movement is imparted to said piston by means of a piston 6 inside of a cylinder 7 supported by the frame of the machine and located above the receptacle 1, the plunger-carrying piston being connected to the rod 8 of the piston 6, as shown in Figs. 1 and 3. The piston in cylinder 7 is actuated by means of steam but if desired, compressed air could be used as the motive power for said piston.

As shown clearly in Figs. 1, 2 and 3, the cylinder 7 is provided with a steam chest 9 and with a slide valve 10 that controls the admission and exhaust of the motive fluid to said cylinder, this slide valve being actuated automatically by mechanism hereinafter described. When the slide valve is in its lowermost position steam will be admitted through the port 11 into the upper end of the cylinder to force the piston 6 downwardly and thus cause the plungers 4 to enter the molds and when the slide valve is in its other extreme position, as shown in Fig. 2, steam will be admitted through the port 12 into the lower end of the cylinder to return the piston 6 and also the plungers 4 to their elevated position. The slide valve is so actuated that both of the ports 11 and 12 will be closed, as shown in Fig. 3, before the piston 6 has completed its downward stroke, thereby causing the steam above the piston to expand and thus impart the final downward movement to the piston.

As previously stated, the final operation of forcing out the water and compacting the pulp fibers together upon the inner faces of the molds is effected by means of steam which is introduced above the water in the receptacle. To this end I have provided the piston rod 8 with a central bore 13 that terminates at its upper end in an admission port 14 above the top side of the piston 6, as shown in Fig. 3, the lower end of said bore being open and communicating with an opening 14ª in the upper side of a tube 15 that extends longitudinally through the plunger-carrying piston 5. The tube 15 is reciprocatingly mounted in a bore in the piston 5 and is provided on its lower side with exhaust ports 16 that aline with exhaust ports 17 in the bore in which the tube is mounted when the tube is in a certain position, said exhaust ports 17 branching laterally from the bore in the piston 5 so as to introduce the steam above the water and between the three rows of plungers 4, as shown in Fig. 1. To prevent the steam from escaping from the tube 15 before the plunger-carrying piston 5 has reached nearly the limit of its downward movement, I have provided means for locking the tube 15 so as to hold the exhaust ports 16 therein out of alinement with the exhaust ports 17 in the bore in which the tube is mounted. This locking means consists of a block 18 connected to the tube 15 and arranged in a guideway formed in the piston carrying plunger and a pin or rod 19 that engages a shoulder 20 on said block, the locking means being shown in operative position in dotted lines in Fig. 2 and in inoperative position in full lines in Fig. 3. The pin or rod 19 is mounted in a guideway in a stationary part of the frame of the machine and when the plunger-carrying piston 5 moves downwardly said pin 19 will drop by gravity and thus hold the tube in such a position that the steam cannot escape through the ports 16 therein. This pin 19 is of less length than the distance which the plunger-carrying piston moves downwardly so that just before said piston has reached the limit of its downward movement, the shoulder 20 on the block 18 will pass out of engagement with the lower end of the pin and thus permit the tube 15 to move to the left, looking at Fig. 3, so that its exhaust ports 16 will aline with the exhaust ports 17, thereby admitting steam above the pulp water which remains in the receptacle to complete the operation of forcing the water out of the molds and compacting the fibers upon the inner faces thereof and also drying the fiber. The tube 15 is moved to the left by the pressure of the steam inside of same, the left-hand end of the tube being closed and the right-hand end being open. When the plunger-carrying piston 5 moves upwardly, back to normal position, an inclined face 21 on the block 18 will come into contact with a stationary device 22 secured to the frame of the machine and thus move the tube 15 to the right to carry the ports 16 therein out of alinement with the ports 17, the pin 19 dropping behind the shoulder 20 on the block to lock the tube.

In order that the plunger-carrying piston 5 will not move upwardly when the steam is admitted above the pulp water to complete the operation of compacting the fibers together, I have provided means for positively locking said piston, said means consisting of a pivotally mounted latch 23 that lies in a horizontal plane and which is adapted to swing over the upper end of a rod 24 connected to the piston 6 and projecting upwardly through a stuffing box in the top of the cylinder 7. This latch 23 is adjustably connected to a support 25 on the top of the cylinder and is provided at its outer end with a notch 26 which embraces a second support 25ª on the top of the cylinder, see Fig. 13, both of said supports being provided with pairs of adjusting nuts 27 between which the latch lies. By varying the positions of these nuts 27 the piston 5 can be locked in different positions. The latch is moved into operative position over the end of the rod 24 by means of a coiled spring 28 as soon as the end of the rod 24 passes below the latch and is moved into inoperative position to release the plunger-carrying piston by mechanism hereinafter described.

The pulp water is supplied to the receptacle 1 by means of a conduit 29 containing comparatively thick pulp water and a conduit 30 containing clear water, the conduit 29 being provided with a spiral conveyer 31 that feeds the thick pulp water through said conduit and both of said conduits being provided with a number of branches 29ª and 30ª that project into a guideway 32 on the front side of the receptacle 1. A valve 33 provided with a number of ports or openings is reciprocatingly mounted in this guideway and said valve is actuated intermittently by mechanism hereinafter described to permit a predetermined quantity of pulp water to flow into the receptacle 1 through openings in the front wall thereof, as shown in Fig. 1. The conduits 29 and 30 are provided with valves so that the operator can regulate the proportions of water and pulp fiber. If the pulp water in the conduit 29 is too thick he can mix fresh water with it from the conduit 30 and thus obtain pulp water of the desired consistency.

As the molds or dies in which the articles are formed are of novel construction I have illustrated one of them in detail in Fig. 5. Referring to said figure, it will be seen that the mold proper is composed of a piece of perforated material 34, the lower end of the mold being contracted slightly so as to produce an article which in a way conforms to the shape of a bottle, the contracted portion of the article incasing the neck of the bottle. The perforated material 34 is surrounded by a strand of wire 35 wound in the form of a spiral, and interposed between this wire and a metallic tube 36 are vertically disposed rods or wires 37. The wire 35 and rods 37 form a substantial backing for the perforated material and also hold said material spaced away from the tube 36 so as to provide a passageway for the water which is forced through the perforations in said material. The perforated material and also the tube 36 are supported by a plate 38 on the turret 3 and said plate is provided with a plurality of openings 39 which permit the water to drain down into a basin 40 in the turret, the turret being provided with a basin for each set of molds and said basins having their lower end contracted, as shown in Fig. 1.

The turret is rotatably mounted on a stationary hollow shaft 41, as shown in Fig. 1, and this shaft is provided at its upper side with openings 42 which aline with the lower end of the basin 40 of the set of molds that is in alinement with the plungers 4, thereby providing an outlet for the water in the basin, said shaft 41 preferably communicating with a conduit that leads to a sewer.

Having described the members which form the articles, I will now describe the mechanism that removes the articles from the molds and conveys them to the place where the articles are collected together. This mechanism comprises a rotatable frame B provided with two sets of pick-up devices 43 that conform to the shape of the interior of the finished articles, and means for moving said devices into the finished articles while they are still in the molds. This mechanism is located in front of the turret which carries the molds, as shown in Figs. 1 and 2, and after one set of articles have been formed the turret is rotated a quarter of a revolution to bring the filled molds into alinement with the pick-up devices, as shown in dotted lines in Fig. 1, the means which actuates the turret being hereinafter described. The frame B consists of two side pieces 44 and end pieces 45 rigidly connected together, the side pieces being journaled on hollow bearings 46 carried by the frame of the machine, as shown in Fig. 10. As both sets of pick-up devices 43 are the same I will only describe the construction of one set. The devices 43 are permanently secured to a plate 47 which lies against one of the end pieces 45 of the frame and said plate is provided with a plurality of yokes 48 which project inwardly through openings 49 in the end piece 45. These yokes are adapted to be engaged by T-shaped heads on rack bars 50 which are actuated to move the plate 47 outwardly and thus force the pick-up devices 43 into the completed articles in the set of filled molds. Thereafter the rack bars 50 are moved in the opposite direction to withdraw the pick-up devices from the molds but prior to the return movement of the plate 47 the completed articles are ejected from the molds onto the pick-up devices 43 by means of a blast of compressed air. The compressed air is introduced into the molds by a pipe 51 located inside of the hollow shaft 41 on which the turret revolves and provided with branches 52 that extend through openings in one side of said shaft, the pipe 51 leading to a tank, not shown, containing air under pressure, said pipe being provided with a valve 53, as shown in Fig. 1. When the set of filled molds, shown in dotted lines in Fig. 1, have been moved into alinement with the pick-up devices, the contracted end of the basin 40 of said set of molds will aline with the branches of the compressed air pipe 51 so that when the valve 53 is opened the compressed air will rush into the molds and force the completed articles onto the pick-up devices 43 and as said devices conform to the shape of the finished articles said articles will not be crushed or damaged. The stem of the valve 53 is provided with a bifurcated extension 54 and the plate 47 which carries the pick-up devices is provided with an arm 55 that engages the bifurcated end of said extension and opens the valve as said plate moves forwardly, the return movement of said plate restoring the valve to normal position and thus cutting off the supply of air.

A movable stripper plate 56 is mounted upon the plate 47 which carries the pick-up devices, said stripper plate being provided with openings, through which the pick-up devices extend, as shown in Fig. 9. For preventing accidental dislodgment of the completed articles after they have been forced onto the pick-up devices I have provided the stripper plate with clamps 57 for engaging the articles and clamping them securely to the pick-up devices, one pair of clamps being provided for each pick-up device. As shown clearly in Figs. 9 and 9ª, the clamps are pivotally connected to the stripper plate and are forced normally away from the pick-up device by means of coiled expansion springs 58 mounted in sockets in the stripper plate. The stripper plate normally lies a short distance away from the plate 47 to which the pick-up devices are connected but when said devices are moved forwardly to enter the articles in the molds, said stripper plate will come into contact with the turret 3 and will thus be forced against the plate 47, as shown in Fig. 9ª. The plate 47 is provided with inclined shoulders 59 and the clamps are provided with yielding extensions 57ª so that when the plate 47 and stripper plate come together the yielding extensions on the clamps will ride up the inclined shoulders 59 and thus force the outer ends of the clamps toward the pick-up device to securely clamp the completed article thereon, the extensions on the clamps springing over the edges of the shoulders 59 and thus locking the stripper plate to the plate 47. As shown in Figs. 5 and 9ª, the molds are provided at their upper ends with recesses 60 to receive the ends of the clamps 57.

After the pick-up devices have been withdrawn from the molds the frame B is rotated one-half of a revolution to move the other set of pick-up devices into operative position to receive the next set of articles that are formed. When the frame comes to rest the stripper plate of the set of pick-up devices that carry completed articles, is moved outwardly to strip the articles from the pick-up devices, this being accomplished by means of rack bars 61 provided with T-shaped heads that interlock with yokes 62 on the stripper plate, said yokes projecting inwardly through openings in the plate 47 and in the end piece 45 of the frame, as shown in Fig. 7. The stripper plate and also the plate which carries the pick-up devices are guided by means of rods 63 connected to the stripper plate and extending through bearings 64 in the end piece of the frame. The rack bars which actuate the pick-up device plate 47 and the stripper plate 56 are mounted in guideways 65 on a stationary support 66 which is connected at its opposite ends to the bearings 46 upon which the frame B is journaled, as shown clearly in Figs. 7 and 10. Pinions 67 are rotatably mounted on the support 66 and each pinion meshes with one of the rack bars 50 and 61 so that rotary movement of the pinion will move said rack bars in opposite directions, thereby causing the pick-up device plate and the stripper plate to operate simultaneously. Rotary movement is imparted to the pinions 67 by means of a rack bar 68 that meshes with small pinions 69 secured to the pinions 67. The clamps 57 release the articles and also unlock the plates when the stripper plate is actuated to strip the articles from the pick-up devices, due to the fact that the pick-up device plate 47 is prevented from moving with the stripper plate, this being effected by a bar 70 secured to the support 66 and provided with a T-shaped head that interlocks with a yoke 71 on the pick-up device plate. While I have herein shown the rack bars 50 and 61 and the bar 70 as being provided with T-shaped heads that coöperate with yokes on the plates 47 and 56, it will, of course, be understood that these coöperating parts could be formed in various ways without departing from the spirit of my invention, it being necessary, however, to construct them so that they will interlock when the frame B moves from one position into its other position. The frame B is locked in position by means of a spring-actuated plunger 72 mounted in a housing 73 on the frame of the machine and provided with a pointed end that engages recesses 74 in the side piece 44 of the frame, the edge portions of the side pieces being provided with inclined grooves 75 into which the locking plunger extends as the frame is revolved so as to gradually move said plunger into its housing against the stress of its actuating spring. A locking device of this character holds the frame in either of its two positions but will release the frame when power is applied thereto to turn it.

The turret 3 which carries the molds or dies has four positions of rest and is locked in these different positions by means of a dog 76 pivotally connected to a stationary part of the frame of the machine and coöperating with lugs 77 on one of the end pieces of the turret, as shown in Fig. 11, the turret being provided with four pairs of such lugs. The dog 76 is forced downwardly between the lugs by means of a coiled expansion spring 78 and is moved upwardly to release the turret by means of a pivotally mounted finger 79 connected to a link 80 which is fastened to the receptacle 1 that receives the pulp water. This link 80 and a companion link 80ª, as well as a second pair of links connected to the opposite end of the receptacle are secured at their lower ends to collars 81 that surround eccentrics 82 on a shaft 83 so that when said shaft is revolved the receptacle 1 will be moved downwardly into snug engagement with the turret 3, the lower edge of the receptacle being provided with packing 1ª so as to produce a water-tight joint between the receptacle and the flattened portion of the turret with which it contacts. After the articles have been formed and the plungers 4 have moved upwardly, the receptacle 1 is raised out of contact with the turret by means of the eccentrics 82 and as the link 80 moves upwardly the finger 79 thereon will engage a projection 76ª on the locking dog and move it out of contact with the lugs 77 on the turret so as to release said turret and permit it to be turned as previously described. As the turret rotates a pin 84 thereon will engage the lower end of the finger 79 and thus release the dog 76 so that it can move downwardly into engagement with the next pair of lugs on the turret to lock it in position. The finger 79 is returned to normal position by means of a leaf spring 85 and when the receptacle 1 is again moved downwardly into engagement with the turret the upper end of the finger will ride over the extension 76ª on the locking dog and then spring underneath same, as shown in Fig. 12, so as to be in position to lift the dog when the receptacle 1 is raised.

Having described the essential elements of the machine which coöperate to produce a finished article and eject it from the machine, I will now describe the mechanism which actuates these elements.

The power is derived from a main shaft 86 provided with a pulley 87 driven by a belt, not shown. A screw 88 is loosely mounted on the main shaft and upon said screw is a controlling block C provided with screw-threads 89 that mesh with those on said screw, this mechanism being shown in detail in Figs. 14 and 16. This controlling block travels longitudinally in opposite directions on the screw 88 and is the means which controls the time of operation of the mechanism that actuates some of the main elements of the machine and also imparts movement to the mechanism which actuates the other main elements of the machine, said block being guided and prevented from turning by a stationary rod 90 that projects through an opening 91 therein. The opposite ends of the screw 88 are provided with clutch teeth, and coöperating with the clutch teeth at the left-hand end of said screw, looking at Figs. 2 and 14, is a clutch 92 splined to the main shaft 86 and adapted to move longitudinally thereof to move into and out of engagement with the teeth on the end of the screw 88. The clutch teeth at the right-hand end of the screw coöperate with a clutch 93 splined to the sleeve of a gear 94 which rotates in a direction opposite to that in which the main shaft rotates, said clutch also being adapted to move longitudinally of the sleeve into and out of engagement with the teeth on the screw. The gear 94 is, of course, loosely mounted on the main shaft and is driven by pinions 95 that mesh with a gear 96 pinned to the main shaft thus constituting a differential gearing. When the clutch 92 that is connected to the main shaft is in engagement with the screw said screw will rotate in the same direction as the shaft and thus cause the controlling block C to move in the direction of the arrow $a$ in Fig. 2, and when the clutch 93 is in engagement with the screw said screw will rotate oppositely to the main shaft and thus cause the controlling block to travel in the direction indicated by the arrow $b$ in Fig. 2. The clutches 92 and 93 are connected together by a bar 97 having forks which engage grooves in the clutches, said bar being shifted in opposite directions by means of a weighted lever 98 engaging pins $97^a$ on the bar. Movement is imparted to this lever by a shifting bar 99 connected to the weighted lever by pins $99^a$, as shown in Fig. 15, and provided at its ends with extensions 100 and 101 that are adapted to be engaged by the controlling block C.

From the foregoing it will be seen that whenever the main shaft of the machine is rotating the controlling block C will travel back and forth longitudinally of the shaft, the direction of movement of said block being reversed automatically when said block engages one of the extensions on the shifting bar 99 and thus causes the clutch bar 97 to be moved.

The turret 3 is driven by means of a gear 102 loosely mounted on the main shaft and meshing with an idle gear 103 that is in mesh with a gear 104 secured to one end of the turret, said gear 102 being provided with clutch teeth 105 that coöperate with a clutch block 106 splined to the main shaft. The clutch block 106 is moved into engagement with the gear 102 so as to cause it to rotate by means of a shifting bar 107 and a spring-actuated lever 108 connected to the outer end of the shifting bar, said lever being moved to throw in the clutch by means of an arm 109 depending from the controlling block when said block moves in the direction of the arrow $b$ in Fig. 2. When the controlling block moves in the opposite direction the spring 110 will return the lever 108 to normal position and thus disengage the clutch block from the gear 102 and permit said gear and the turret to come to rest, the turret having made a quarter of a revolution. The frame B which carries the pick-up devices makes a half revolution while the turret is making a quarter revolution and said frame is turned by means of the idle gear 103 which meshes with a gear 111 secured to one of the side pieces of the frame B.

The eccentrics 82 which move the pulp-holding receptacle 1 down into contact with the turret are secured to a shaft 83, as previously stated, and fastened to the right-hand end of said shaft is a gear 112 which meshes with a gear 113 loosely mounted on the main shaft. This loose gear is provided with clutch teeth 114 that coöperate with a clutch block 115 splined to the main shaft and adapted to be moved into and out of engagement with the teeth on the loose gear 112 by means of a lever 116 to which a shifting bar 117 is fastened. As the pulp receptacle has to be lowered and raised once for each quarter revolution of the turret it is necessary to move the clutch block 115 into and out of engagement with the gear 112 twice during each cycle of operations of the machine. This is effected by means of two plungers 118 and 119 which are connected at their lower ends to bell crank levers $118^a$ and $119^a$ fastened to the shifting bar 117. The upper ends of these plungers are provided with rolls that enter an irregular groove 120 in the side of the controlling block C.

As shown in detail in Fig. 16, the controlling block is provided with two movable gates 121 and 122 whose underneath faces form part of the irregular groove 120, these gates being connected to the opposite ends of a lever 123 that is pivoted to the controlling block. When the controlling block moves in the direction of the arrow $a$ in Fig. 2 the gate 122 will be raised and the gate 121 will be depressed so that the roller on the plunger 118 can enter the right-hand end of the irregular groove 120. This groove is so shaped that it will move the plunger 118 downwardly and thus throw the clutch block 115 into engagement with the gear 112 to cause the shaft 83 to make one-half a revolution, thereby moving the pulp receptacle 1 into engagement with the turret. The groove 120 in the controlling block then returns the plunger 118 to normal position so as to disengage the clutch block from the gear 112 which comes to rest. As the roll on the plunger 118 comes into engagement with the gate 121 it will raise said gate and thus depress the gate 122, thereby closing the right-hand end of the groove 120 and leaving the left-hand end of the groove open, as shown in Fig. 2.

Each of the gates is provided with an inclined face 124 and as the controlling block continues its movement in the direction of the arrows $a$, the inclined face of gate 122 will come into contact with the roll on the plunger 119. The plunger will not be depressed, however, due to the fact that it is formed in two sections that are connected together by a rule joint, so that the upper section will yield and ride up over the gate 122 without imparting movement to the clutch block 115, the upper section of the plunger being returned to normal position by means of a flat spring secured to the lower section of the plunger and bearing upon the upper hinged section. During the last half of the cycle of operations when the controlling block moves in the opposite direction indicated by the arrow $b$ in Fig. 2, the roller on the plunger 119 will enter the left-hand end of the groove 120 in the controlling block so that said plunger will be depressed and thus move the clutch block 115 into engagement with the gear 112 to complete the revolution of the shaft 83 and thus raise the pulp water receptacle 1. As the roll on the plunger 119 comes into contact with the gate 122 it will raise said gate and accordingly depress the gate 121 so that the inclined face 124 on said gate will engage the roller on the plunger 118 and move the upper section thereof outwardly without depressing said plunger.

The mechanism that actuates the valve 33 which controls the admission of pulp water to the receptacle 1 consists of a bell crank lever 125 connected to one end of the valve bar 126, as shown in Fig. 2, and joined by means of a link 127 to a lever 128 pivotally connected to the frame of the machine, said lever being provided at its inner end with a roll that projects into an irregular groove 129 formed in the side of the controlling block C. This lever 128 is also formed in two sections, the outer section which carries the roll being hinged in the same manner as the plungers 118 and 119, previously described. The groove 129 does not extend all the way across the face of the controlling block but terminates adjacent the center of the block, as shown in Fig. 16, and fastened to the side of the block is a plate 130 provided with an inclined lower edge. A notch or groove 131 provided with an inclined bottom is formed in the side of the block at the lower edge of the plate 130 and this groove is on a line with the right-hand end of the groove 129. As the controlling block moves in the direction of the arrow $a$ in Fig. 2 the roll on the lever 128 will enter the right-hand end of the groove 129 and thus raise said lever so as to pull the link 127 downwardly to cause the valve 33 to be opened to permit the pulp water to enter the receptacle 1. When the lower edge of the plate 130 on the controlling block comes into engagement with the roll on the lever 128 said lever will be rocked in the opposite direction to return the valve 33 to normal position to cut off the supply of pulp water. When the controlling block moves in the opposite direction, as indicated by the arrow $b$, the roll on the lever 128 will enter the groove or notch 131 in the block and the hinged section of the lever will yield so that the roll can ride over the face of the block without entering the groove 129, thus preventing movement being imparted to the valve 33.

As the valve 33 moves back to normal closed position, a hinged bar 132 connected to the right-hand end of the valve engages a bell crank lever 133 and actuates it. The long arm of this bell crank lever is connected to a rod 134 which is secured to the slide valve 10 in the steam chest of cylinder 7 so that the slide valve will be moved downwardly to permit the steam to enter the port 11 of the cylinder and thus cause the piston 6 to move downwardly. The hinged bar 132 is moved out of engagement with the bell crank lever 133 by means of a rigid projection 135 upon which an inclined portion 136 of the hinged section of the bar rides, as shown in Fig. 2. When the piston 6 has completed about three quarters of its downward movement a hinged dog 137, connected to a support 138 on the plunger-carrying piston 5, comes into engagement with a lever 139 pivotally connected to a stationary part of the frame of the machine and having its inner end arranged underneath a pin 140 on the rod or stem 134 of the slide valve 10, as shown in detail in Fig. 4, further downward movement of the piston causing the dog to rock the lever 139 and thus move the slide valve into the position shown in Fig. 3 to cut off both of the ports and permit the expansion of the steam in the cylinder 7 to complete the downward stroke of the piston 6, as previously described. The slide valve 10 is moved into position to permit the steam to enter the port 12 and thus raise the piston 6 by means of a trip or projection 141 on the pulp water receptacle which engages the lower end of the stem 134 of the slide valve when said receptacle is raised out of contact with the turret. Before the piston 6 can move upwardly, however, the latch 23 which extends over the upwardly projecting rod 24 on said piston must be moved into inoperative position. This is effected by means of a bell crank lever 142 which engages a pin 143 on the pivoted end of said latch, said bell crank lever being actuated by means of a lever 144 to the outer end of which a rod 145 is connected. Said rod is normally forced downwardly by means of a coiled spring 146 surrounding said rod and interposed between a stationary bracket 147 and a collar 148 fixed to the rod, as shown in Fig. 2, the rod being raised upwardly to actuate the bell crank lever 142 by means of a pin 149 on the gear 112 which comes into contact with the lower end of the rod as the gear revolves.

The rack bar 68 which primarily imparts movement to the rack bars 50 and 61 of the pick-up device mechanism, is fastened at its outer end to a lever 150 pivotally connected to a stationary part of the frame of the machine. A link 151 is connected to the lever 150 and the opposite end of said link is provided with a pin that enters a slot 152 in one arm 153 of a bell crank lever which is fulcrumed on a stationary support, said bell crank lever lying in a horizontal plane and being shown clearly in Figs. 7 and 10. The other arm of said bell crank has a hinged section 154 provided with a roll that enters a groove 155 formed in the top face of the controlling block C. A plate 156 provided with an inclined edge is secured to the top of the controlling block and at the outer end of said plate is an inclined groove 157 in the top of the controlling block. When the controlling block moves in the direction of the arrow *a* in Fig. 14 the roll on the hinged section 154 of the bell crank lever will enter the right-hand end of the groove 155 and thus impart movement in one direction to the lever 150 to which the rack bar 68 is connected and when said roll comes into contact with the inclined edge of the plate 156 the rack bar 68 will be moved in the opposite direction. When the controlling block moves in the opposite direction the roll on the arm 154 will enter the groove or notch 157 and thus ride up over the top face of the controlling block without oscillating the bell crank lever or the rack bar 68.

From the foregoing it will be seen that I have devised a machine which is entirely automatic in its operation and which will form a great number of articles and eject them from the machine in a short space of time. While I have herein shown the preferred form of my invention as embodied in a machine for forming tubular-shaped bottle wrappers, it will, of course, be understood that the machine could be used for forming various other articles such, for example, as paper cans, bottles and receptacles of different shape and form by substituting dies and pick-up devices of different shape from those herein shown. Furthermore, I do not wish it to be understood that the means for removing the articles from the dies is limited to pick-up devices which project into the articles as said devices could be so formed that they would embrace the articles. The machine is designed to form articles from liquid pulp fiber but by slightly modifying parts of the machine it could be used for forming articles from other substances held in suspension in a liquid.

Having thus described my invention, what I claim as new and desire to secure by Letters Patent is:

1. In a machine of the character described, a perforated die of approximately tubular form adapted to receive a charge of liquid pulp fiber, means for forcing the liquid through the openings in said die and compacting the fiber closely together on the walls thereof, a movable pick-up device conforming to the shape of the complete article and adapted to be projected into same, and means for blowing the completed article from the die onto said pick-up device; substantially as described.

2. In a machine of the character described, a perforated die of approximately tubular form adapted to receive a charge of liquid pulp fiber, means for forcing the liquid through the openings in said die and compacting the fiber closely together on the walls thereof, a movable pick-up device conforming to the shape of the complete article and adapted to be projected into same, means for blowing the completed article from the die onto said pick-up device, and a stripping device adapted to be moved longitudinally over the pick-up device to eject the completed article therefrom; substantially as described.

3. In a machine of the character described, a hollow perforated die, means for admitting a predetermined quantity of liquid pulp fiber into said die, means for forcing the liquid through the openings in said die and compacting the fiber closely together on the walls thereof to form an approximately tubular-shaped article, a pick-up device conforming to the shape of the completed article, means for moving said device into said article and thereafter away from the die, a stripper, and means for actuating said stripper to eject the completed article from the pick-up device; substantially as described.

4. In a machine of the character described, a hollow die of approximately tubular form having openings formed in the side walls thereof, means for admitting a predetermined quantity of pulp water into said die, a plunger, means for moving said plunger into said die to displace the major portion of the water through the openings in the die, and means for thereafter introducing air or steam above the surface of the pulp water to complete the operation of compacting the fibers together upon the inner face of the die; substantially as described.

5. In a machine of the character described, a hollow die or mold adapted to receive a charge of pulp water, means for introducing pulp water into said die, means for forcing the water out of the pulp and compacting the fibers closely together upon the inner face of the die to form an article, a pick-up device conforming to the shape of the article, means for moving said pick-up device into the article while it is still in said die, means for blowing the article out of the die and onto said pick-up device, and means for thereafter separating the die and said pick-up device; substantially as described.

6. In a machine of the character described, a hollow die or mold consisting of a shell of perforated material, a tubular member surrounding said shell, and means interposed between said member and shell to form a backing for the shell, all of said parts being permanently connected together, substantially as described.

7. In a machine of the character described, a die or mold consisting of a tubular-shaped shell formed of perforated material, a tubular member surrounding said shell and spaced away therefrom, and rods interposed between said shell and member to form a backing for the shell; substantially as described.

8. In a machine of the character described, a hollow die or mold consisting of a tubular-shaped shell formed of perforated material, a member surrounding said shell and spaced away therefrom, a strand of wire wrapped around the exterior of said shell, and rods interposed between said wire and the member that surrounds the shell; substantially as described.

9. In a machine of the character described, a movable member provided with dies or molds, means for forming articles from liquid pulp fiber in said dies, means for moving said member, pick-up devices, means for ejecting the articles from the dies and onto said pick-up devices, and automatically operated mechanical means for stripping the articles from said pick-up devices; substantially as described.

10. In a machine of the character described, a member provided with sets of hollow dies, means for automatically introducing charges of pulp water into said dies, means for forcing the water out of the dies to compact the pulp fibers upon the inner faces of the dies to form articles, means for moving said die-carrying member, pick-up devices conforming to the shape of the articles, means for blowing the articles out of the dies and onto said pick-up devices, and mechanical means for thereafter engaging the articles and stripping them from said pick-up devices; substantially as described.

11. In a machine of the character described, a receptacle for holding pulp water, a member provided with sets of dies adapted to receive a charge of pulp water from said receptacle, means for forcing the water out of the pulp fibers and compacting them together upon the inner faces of the dies, means for moving the die-carrying member to bring an empty set of dies into alinement with the pulp water receptacle, and means for ejecting the finished articles from the dies in which they were formed; substantially as described.

12. In a machine of the character described, a turret provided with a plurality of sets of dies, automatic means for supplying said dies with charges of liquid pulp fiber, means for compacting the fibers together to form articles, pick-up devices located adjacent said turret, means for rotating the turret to bring the dies into alinement with said pick-up devices, means for ejecting the articles from the dies and onto said pick-up devices, and means for separating the completed articles from the pick-up devices; substantially as described.

13. In a machine of the character described, a rotatable turret provided with sets of dies rigidly mounted thereon and provided with openings, a movable receptacle located adjacent said turret and having one end open, guides stationary with respect to the turret and having said receptacle movably mounted therein, means for moving the open end of said receptacle into engagement with the turret when one set of dies comes into alinement with the receptacle, means for introducing a charge of liquid pulp fiber into said receptacle so that it can flow into said dies, and means for forcing the liquid through the openings in said dies so as to compact the fibers closely together upon the inner faces of the dies; substantially as described.

14. In a machine of the character described, a turret provided with sets of hollow perforated dies, a receptacle located adjacent said turret and having one end open, said receptacle being mounted in stationary guides, mechanism for moving said receptacle into engagement with said turret for a predetermined length of time and thereafter out of engagement with said turret, means for introducing a supply of pulp water into said receptacle while it is in engagement with said turret so that said pulp water can flow into said dies, means for forcing the water through the openings in the dies to compact the pulp fibers upon the inner faces of same, and means for thereafter rotating the turret away from said receptacle; substantially as described.

15. In a machine of the character described, a receptacle for holding pulp water, a conduit for conducting pulp water to said receptacle, and means under control of the operator for varying the consistency of the material which is introduced into said receptacle; substantially as described.

16. In a machine of the character described, an open-ended receptacle, automatic means for introducing charges of liquid pulp fiber into said receptacle, a movable member provided with a set of hollow perforated dies and adapted to close the lower end of said receptacle, a piston mounted in said receptacle and provided with plungers, means for forcing said piston downwardly to cause the plungers to project into the dies and displace the liquid from the pulp fiber, and means for moving said member to carry the dies away from said receptacle; substantially as described.

17. In a machine of the character described, a set of hollow perforated dies adapted to receive a charge of pulp water, a member provided with plungers that conform to the shape of said dies, means for moving said member to carry the plungers into said dies to force the major portion of the pulp water out of the pulp fibers, means for locking said member in its depressed position, and means for thereafter introducing air or steam above the surface of the pulp water to complete the operation of compacting the fibers together upon the inner faces of the dies; substantially as described.

18. In a machine of the character described, a receptacle adapted to receive pulp water, a member provided with hollow dies and adapted to close the lower end of said receptacle, a piston mounted in said receptacle and provided with plungers, a cylinder provided with a piston which is connected to the plunger-carrying piston, means for introducing a motive fluid into said cylinder to actuate the piston therein, and means for conducting the motive fluid from said cylinder to the underneath side of the plunger-carrying piston; substantially as described.

19. In a machine of the character described, a receptacle adapted to hold pulp water, a member closing the lower end of said receptacle and provided with hollow dies, a piston mounted in said receptacle, plungers connected to said piston, a cylinder provided with a piston which is connected to the plunger-carrying piston, means for introducing a motive fluid into said cylinder, means for establishing communication between said cylinder and the underneath side of the plunger-carrying piston, and automatically operated means for controlling the passage of the motive fluid from the cylinder to the underneath side of the plunger-carrying piston; substantially as described.

20. In a machine of the character described, a turret provided with sets of hollow dies having openings therein, a drain basin for each set of dies, and a discharge conduit provided with openings which aline with the basin of the set of dies which is in operative position; substantially as described.

21. In a machine of the character described, a rotatable turret provided with a plurality of sets of dies having openings therein, means for charging said dies with liquid pulp fiber, means for forcing the liquid out of the pulp fiber and compacting the fibers upon the inner faces of the dies, a drain basin for each set of dies, and a discharge conduit provided with openings with which the drain basins of the dies aline as the turret rotates; substantially as described.

22. In a machine of the character described, a receptacle having its lower end open, a turret provided with sets of dies adapted to close the lower end of said receptacle, automatically operated means for introducing charges of pulp water into said receptacle, means for rotating the turret to carry the dies away from said receptacle, and means for locking the turret; substantially as described.

23. In a machine of the character described, a receptacle for holding liquid pulp fiber, a hollow die closing one end of said receptacle and provided with openings, a piston operating in said receptacle and provided with a plunger for displacing the major portion of the liquid through the openings in said die, and means for blowing the remaining portion of the liquid through the openings in the die to compact the pulp fibers closely together; substantially as described.

24. In a machine of the character described, a receptacle for holding liquid pulp fiber, a hollow die closing one end of said receptacle and provided with openings, a piston mounted in said receptacle and provided with a plunger which displaces some of the liquid through the openings in the die as the piston moves downwardly, means for actuating said piston, and means operating after the piston has reached a certain position for introducing steam above the charge in said receptacle to complete the operation of displacing the liquid and compacting the pulp fibers closely together upon the face of the die; substantially as described.

25. In a machine of the character described, a receptacle for holding liquid pulp fiber, a piston operating in said receptacle and provided with an opening through which ports lead to the underneath side of the piston, a cylinder provided with a piston, a hollow piston rod connecting said pistons together, a port in said rod above the piston in the cylinder, and a valve for controlling the ports in the opening of the receptacle piston; substantially as described.

26. In a machine of the character described, a receptacle for holding liquid pulp fiber, a piston operating in said receptacle and provided with an opening from which ports lead to the underneath side of the piston, a cylinder provided with a piston, means for establishing communication between the cylinder and the opening in the receptacle piston, a valve for controlling the ports in the receptacle piston, a locking device for said valve, and means whereby said locking device releases the valve when the piston reaches a certain position; substantially as described.

27. In a machine of the character described, a receptacle for holding liquid pulp fiber, a piston operating in said receptacle and provided with an opening from which ports lead to the underneath side of the piston, a cylinder provided with a piston, means for establishing communication between the cylinder and the opening in the receptacle piston, a valve for controlling the ports in the receptacle piston, a locking device for said valve, means whereby said locking device releases the valve when the piston reaches a certain position, and means for restoring the valve to normal position; substantially as described.

28. In a machine of the character described, a receptacle for holding liquid pulp fiber, a piston mounted in said receptacle and provided with a bore from which ports lead to the underneath side of the piston, a tubular-shaped valve mounted in said bore and provided with exhaust ports, a cylinder provided with a piston, a piston rod connecting said pistons together and having a passageway that establishes communication between the cylinder and the interior of the tubular-shaped valve, a locking device for said valve, and means whereby the valve is released from said locking device so that the force of the motive fluid can move the valve into position to permit the escapement of the motive fluid to the underneath side of the receptacle piston; substantially as described.

29. In a machine of the character described, a receptacle for holding liquid pulp fiber, a piston mounted in said receptacle and provided with a straight horizontally disposed bore having discharge ports, a tube reciprocatingly mounted in said bore and having one of its ends closed, said tube being provided with discharge ports, a cylinder provided with a piston, means for connecting said pistons together, means for conducting the motive fluid from the cylinder to the interior of said tube, and means for permitting the motive fluid to escape from said tube when the piston reaches a certain position; substantially as described.

30. In a machine of the character described, a receptacle for holding liquid pulp fiber, a piston mounted in said receptacle and provided with a straight horizontally disposed bore having discharge ports, a tube reciprocatingly mounted in said bore and having one of its ends closed, said tube being provided with discharge ports, a cylinder provided with a piston, means for connecting said pistons together, means for conducting the motive fluid from the cylinder to the interior of said tube, a device carried by the stationary part of the machine for engaging said tube to hold it in such a position that the motive fluid cannot escape therefrom until the piston reaches a certain position, and a stationary member adapted to engage an inclined face on the tube to move it and thus cut off the motive fluid as the piston is returning to normal position; substantially as described.

31. In a machine of the character described, a receptacle for holding liquid pulp fiber, a piston for displacing the contents of said receptacle, means for actuating said piston, means for locking said piston when it has reached a certain position, and means for introducing a motive fluid upon the underneath side of said piston to complete the operation of displacing the contents of the receptacle; substantially as described.

32. In a machine of the character described, a receptacle for holding liquid pulp fiber, a piston for displacing the contents of said receptacle, means for actuating said piston, means for locking said piston when it has reached a certain position, means for introducing a motive fluid upon the underneath side of said piston to complete the operation of displacing the contents of the receptacle, and automatically operated means for moving said locking means into an inoperative position to permit the piston to return to normal position; substantially as described.

33. In a machine of the character described, a receptacle for holding liquid pulp fiber, a piston for displacing the contents of said receptacle, means for actuating said piston, adjustable means for locking the piston after it has reached a certain position, automatically operated means for releasing the locking means to permit the piston to return to normal position; substantially as described.

34. In a machine of the character described, a receptacle for holding liquid pulp fiber, a piston operating in said receptacle to displace the major portion of the contents thereof, means for actuating said piston, means for introducing a motive fluid into said receptacle to complete the operation of displacing the contents thereof, a device connected to said piston, a spring-actuated latch for engaging said device when the piston has reached a certain position to lock it, and means for moving said latch out of engagement with said device to permit the piston to return to normal position; substantially as described.

35. In a machine of the character described, a receptacle for holding liquid pulp fiber, a piston operating in said receptacle to displace the contents thereof, a cylinder provided with a piston, means for connecting said pistons together, ports in the walls of said cylinder for admitting the motive fluid to both sides of the piston therein, a valve for controlling said ports, automatically operated means for actuating said valve, and independent means for actuating said valve to close both of said ports simultaneously and permit the motive fluid to expand and thus complete the movement of the piston; substantially as described.

36. In a machine of the character described, a receptacle for holding liquid pulp fiber, a piston for displacing the contents of said receptacle, a cylinder having a piston mounted therein, means for connecting said pistons together, a valve for controlling the admission and exhaust of the motive fluid to said cylinder, means for actuating said valves to admit the motive fluid to one side of the piston in the cylinder to move it in one direction, a lever for engaging the stem of said valve, and means carried by the receptacle piston for actuating said lever to move the valve into position to cut off the admission and exhaust of the motive fluid in the cylinder; substantially as described.

37. In a machine of the character described, a die, means for forming an article out of liquid pulp fiber in said die, a frame carrying a pick-up device, means for reciprocating said pick-up device relatively to the frame to carry it into the die to receive the article and thereafter out of the die, and means for moving the pick-up device away from the die; substantially as described.

38. In a machine of the character described, dies and coöperating means for forming articles out of liquid pulp fiber, a movable frame provided with a plurality of sets of pick-up devices, means for ejecting articles from the dies onto one set of said pick-up devices, means for actuating said frame to move the set of pick-up devices which carry the articles away from the dies and to move another set of pick-up devices into operative position, and means for stripping the articles from the pick-up devices on which they are mounted; substantially as described.

39. In a machine of the character described, a die and coöperating means for forming an article out of liquid pulp fiber, a conduit for conducting compressed air to the interior of said die, a valve for controlling the passage of air through said conduit, a pick-up device conforming to the shape of the finished article, means for moving said pick-up device toward the die, and means actuated by the movement of said pick-up device for actutating said valve to permit the compressed air to enter the die and blow the finished article onto said pick-up device; substantially as described.

40. In a machine of the character described, a die and coöperating means for forming an article out of liquid pulp fiber, a conduit for conducting compressed air to the interior of said die, a valve for controlling the passage of compressed air through said conduit, a frame carrying a pick-up device, means for moving said frame toward the die, means operated by the movement of said frame for actuating said valve to permit the compressed air to enter the die and force the completed article onto said pick-up device, and means for moving the pick-up device away from the die; substantially as described.

41. In a machine of the character described, a die and coöperating means for forming an article out of liquid pulp fiber, a pick-up device, means for forcing the completed article out of the die and onto said pick-up device, means for clamping said article to the pick-up device, means for moving the pick-up device away from the die, and means for stripping the article from the pick-up device; substantially as described.

42. In a machine of the character described, a turret provided with a plurality of sets of dies or molds, means for forming articles from liquid pulp fiber in said molds, said means being carried by a support which is stationary with respect to the turret, means for moving said turret to carry the filled dies away from the forming means and bring an empty set of dies into operative position, a frame carrying a plurality of sets of pick-up devices, means for moving one set of pick-up devices toward the filled dies, means for ejecting the completed articles from said dies onto the pick-up devices, and means for moving said frame to carry the pick-up devices on which the articles are mounted away from the dies and thus bring the other set of pick-up devices into operative position; substantially as described.

43. In a machine of the character described, a plurality of sets of dies and coöperating means for forming articles from liquid pulp fiber, a pick-up mechanism comprising a frame and a plurality of sets of pick-up devices adapted to receive the articles formed in said dies, stripping plates for removing the articles from said pick-up devices, and means for simultaneously actuating the stripping plate of one set of pick-up devices and moving the other set of pick-up devices into position to receive the completed articles from the dies; substantially as described.

44. In a machine of the character described, a pick-up mechanism comprising a frame, plates carried by said frame and provided with pick-up devices, yoke-shaped devices secured to said plates, bars connected to a stationary support and having heads which project into said yoke-shaped devices, and means for reciprocating said bars; substantially as described.

45. In a machine of the character described, a pick-up device comprising a frame, plates carried by said frame and provided with pick-up devices, stripping plates surrounding said pick-up devices, yoke-shaped members connected to said stripping plates and to the plates which carry the pick-up devices, bars provided with heads which interlock with said yoke-shaped members, and means for actuating said bars; substantially as described.

46. In a machine of the character described, a pick-up mechanism comprising a frame, a plurality of plates mounted on the end pieces of said frame and having pick-up devices secured thereto, stripping plates mounted on said pick-up devices, and means for simultaneously actuating the stripping plate of one set of pick-up devices and the plate which carries the other set of pick-up devices; substantially as described.

47. In a machine of the character described, a pick-up mechanism comprising a frame, a plurality of plates mounted on said frame and having sets of pick-up devices secured thereto, stripping plates surrounding said pick-up devices, yoke-shaped members secured to said pick-up device plates and to said stripping plates, rack bars provided with heads which interlock with the yoke-shaped members on the stripping plates, rack bars provided with heads which interlock with the yoke-shaped members on the pick-up device plates, and means for moving said rack bars in opposite directions; substantially as described.

48. In a machine of the character described, a main shaft, a screw loosely mounted on said shaft, a clutch splined to said shaft and adapted to coöperate with teeth in one end of said screw, a gear rotating oppositely to the shaft and provided with a clutch which coöperates with teeth on the other end of the screw, a controlling block adapted to travel longitudinally of the screw, and automatically operated means for moving one of the said clutches int engagement with the screw for a predetermined length of time and then disengage it from the screw and move the other clutch into engagement with the screw to change the direction of movement of the controlling block; substantially as described.

49. In a machine of the character described, a rotating drive shaft, a screw loosely mounted on said shaft, a clutch splined to said shaft and adapted to coöperate with teeth in one end of said screw, a gear rotating oppositely to the shaft and carrying a clutch which coöperates with teeth on the other end of the screw, a controlling block adapted to travel longitudinally of said screw, and automatically operated means for shifting said clutches into and out of engagement with said screw for causing the con rolling block to travel in opposite directions; substantially as described.

50. In a machine of the character described, a drive shaft, a screw loosely mounted on said shaft, a clutch splined to said shaft and adapted to coöperate with teeth in one end of said screw, a gear rotating oppositely to the shaft and provided with a clutch which coöperates with teeth on the other end of the screw, a controlling block adapted to travel longitudinally of said screw, and means actuated by said controlling block for holding one of said clutches in engagement with the screw for a predetermined length of time and thereafter moving it out of engagement and carrying the other clutch into engagement with the screw to reverse the direction of movement of the controlling block; substantially as described.

51. In a machine of the character described, a drive shaft, a screw loosely mounted on said shaft, means for causing said screw to rotate in the same direction as the shaft for a predetermined time and thereafter rotate oppositely to the shaft, and a controlling block adapted to travel longitudinally of the screw; substantially as described.

52. In a machine of the character described, a drive shaft, a screw loosely mounted on said shaft, a clutch rotating with the shaft and adapted to coöperate with teeth in one end of said screw, a clutch rotating oppositely to the shaft and adapted to coöperate with teeth in the other end of the screw, a bar connecting said clutches together, a lever for shifting said bar, and a controlling block traveling on said screw and adapted to actuate said shifting lever; substantially as described.

53. In a machine of the character described, a drive shaft, a screw loosely mounted on said shaft, a clutch rotating with said shaft and adapted to engage said screw, a second clutch rotating oppositely to the shaft and also adapted to engage said screw, a bar connecting said clutches together, a lever engaging said bar, a shifting bar for said lever, and a controlling block traveling longitudinally of said screw and adapted to actuate said shifting bar to change the direction of rotation of the screw; substantially as described.

54. In a machine of the character described, a turret, a continuously rotating drive shaft, a pinion loosely mounted on said shaft and meshing with a gear secured to the turret, a clutch splined to the shaft and adapted to coöperate with clutch teeth on said pinion, and an automatically operated controlling block for causing said clutch to be held in engagement with said pinion for a predetermined length of time and then be automatically disengaged therefrom; substantially as described.

55. In a machine of the character described, a main drive shaft, a gear loosely mounted on said shaft and provided with clutch teeth, a clutch splined to said shaft, a controlling block, means for causing said controlling block to reciprocate, a shifting bar for actuating said clutch, and means actuated by said controlling block for moving the clutch into engagement with the gear intermittently; substantially as described.

56. In a machine of the character described, a main drive shaft, a gear loosely mounted on said shaft and provided with clutch teeth, a clutch splined to said shaft, a controlling block, means for causing said controlling block to reciprocate, a shifting bar for actuating said clutch, a plunger connected to a bell crank lever which is fastened to said shifting bar, and an irregularly-shaped groove in the controlling block for receiving a projection or friction roll on said plunger; substantially as described.

57. In a machine of the character described, a main drive shaft, a gear loosely mounted on said shaft and provided with clutch teeth, a clutch splined to said shaft, a controlling block, means for causing said controlling block to reciprocate, a shifting bar for actuating said clutch, a plurality of plungers connected by bell crank levers to the shifting bar and provided at their upper ends with projections or friction rolls, an irregularly-shaped groove in the controlling block adapted to receive the projections on the plungers, and means for causing the projection on one of the plungers to enter said groove when the controlling block travels in one direction and the projection on the other plunger to enter said groove when the controlling block travels in the opposite direction; substantially as described.

58. In a machine of the character described, a main drive shaft, a gear loosely mounted on said shaft and provided with clutch teeth, a clutch splined to said shaft, a controlling block, means for causing said controlling block to reciprocate, a shifting bar for actuating said clutch, a plurality of plungers connected to said shifting bar and provided with lateral projections or extensions, an irregularly-shaped groove in the controlling block adapted to receive said projections, and movable gates on the controlling block for holding the extension on one of the plungers out of said groove when the controlling block travels in one direction, and for holding the extension on the other plunger out of the groove when the controlling block travels in the opposite direction; substantially as described.

59. In a machine of the character described, a receptacle for receiving liquid pulp fiber, a valve for controlling the admission of the liquid pulp fiber to said receptacle, a reciprocating controlling block provided with inclined surfaces, a lever adapted to be raised and lowered by the inclined surfaces on said controlling block when said block moves in one direction, means for transmitting the movement of said lever to said valve, and means whereby the movement in the opposite direction of said controlling block does not actuate said lever; substantially as described.

60. In a machine of the character described, a receptacle for holding liquid pulp fiber, a valve for controlling the admission of the liquid pulp fiber to said receptacle, a cylinder provided with a piston, a member actuated by said piston for displacing the contents of said receptacle, a valve for controlling the admission and exhaust of a motive fluid to said cylinder, and means actuated by the valve of said receptacle for imparting movement to the valve which controls the admission and exhaust of the motive fluid to said cylinder; substantially as described.

61. In a machine of the character described, a receptacle for holding liquid pulp fiber, a valve for controlling the admission of liquid pulp fiber to said receptacle, a cylinder provided with a piston, a member actuated by said piston for displacing the contents of said receptacle, a valve for controlling the admission and exhaust of a motive fluid to said cylinder, a bell crank lever connected to the stem of said valve, and a hinged bar on the valve for the pulp fiber receptacle for engaging and actuating said bell crank lever; substantially as described.

62. In a machine of the character described, a pick-up device, a reciprocating controlling block, and mechanism actuated by said controlling block for imparting movement to said pick-up device; substantially as described.

63. In a machine of the character described, a member provided with sets of dies, means for moving said member intermittently, means for introducing charges of liquid pulp fiber to the dies on said member as they arrive in a certain position, means for forcing the liquid out of the fibers and compacting them together to form articles, pick-up devices conforming to the shape of the articles formed in said dies, means for ejecting the articles from the dies and onto said pick-up devices, and means for stripping the articles from said pick-up devices; substantially as described.

64. In a machine of the character described, a member provided with sets of dies or molds provided with openings, means for intermittently introducing charges of liquid pulp fiber to said dies, means for forcing the liquid through the openings in the dies to compact the pulp fibers together to form articles, pick-up devices conforming to the shape of the articles, and means for blowing the articles from the dies and onto said pick-up devices; substantially as described.

65. In a machine of the character described, an intermittently moving turret provided with dies, automatically operated means for introducing charges of liquid pulp fibers to said dies, means for forcing the liquid out of the fibers and compacting the fibers together to form articles, pick-up devices, automatic means for moving said pick-up devices into alinement with dies that contain completed articles, means for forcing the articles from the dies and onto said pick-up devices, and means for ejecting the articles from the pick-up devices; substantially as described.

66. In a machine of the character described, an intermittently moving turret provided with sets of dies or molds, means for introducing charges of liquid pulp fiber to said dies as they arrive in a certain position, pick-up devices adapted to aline with the dies which contain completed articles, means for blowing the articles from the dies and onto said pick-up devices, and automatic means for actuating the turret and the pick-up devices; substantially as described.

67. In a machine of the character described, a turret provided with sets of dies or molds, mechanism for rotating said turret, means for introducing charges of liquid pulp fiber to said molds, means coöperating with the dies to form articles from the liquid pulp fiber, pick-up devices, mechanism for actuating said pick-up devices to carry them into alinement with the dies that contain completed articles and thereafter away from said dies, and a controlling block for governing the time of operation of the turret actuating mechanism, the forming means that coöperates with the dies, and the pick-up actuating mechanism; substantially as described.

In testimony whereof I hereunto affix my signature in the presence of two witnesses, this third day of June 1907.

FRANK C. EMRICK.

Witnesses:
WELLS L. CHURCH,
GEORGE BAKEWELL.